(12) United States Patent
Baskovic

(10) Patent No.: US 9,689,653 B2
(45) Date of Patent: Jun. 27, 2017

(54) FASTENER SIZE MEASUREMENT TOOL

(71) Applicant: MANHATTAN SOLUTION, LLC, Manhattan Beach, CA (US)

(72) Inventor: Ante L. Baskovic, Manhattan Beach, CA (US)

(73) Assignee: MANHATTAN SOLUTION, LLC, Manhattan Beach, CA (US)

( * ) Notice: Subject to any disclaimer, the term of this patent is extended or adjusted under 35 U.S.C. 154(b) by 142 days.

(21) Appl. No.: 14/925,936

(22) Filed: Oct. 28, 2015

(65) Prior Publication Data
US 2017/0122717 A1 May 4, 2017

(51) Int. Cl.
*G01B 3/20* (2006.01)

(52) U.S. Cl.
CPC ..................... *G01B 3/20* (2013.01)

(58) Field of Classification Search
CPC ....................................................... G01B 3/20
USPC .................................. 33/201, 783, 784, 832
See application file for complete search history.

(56) References Cited

U.S. PATENT DOCUMENTS

| | | | | |
|---|---|---|---|---|
| 5,548,903 A * | 8/1996 | Johnson | ................... | G01B 3/38 33/679.1 |
| 6,145,207 A * | 11/2000 | Brunson | ................ | G01B 3/205 33/199 B |
| 6,223,136 B1 * | 4/2001 | Geiger | ................... | G01B 3/205 33/1 L |
| 7,013,763 B2 * | 3/2006 | Hsien | ..................... | B25B 13/12 81/165 |
| 7,373,735 B2 | 5/2008 | Jacobs | | |
| 9,316,474 B2 * | 4/2016 | Stockman | ................ | G01B 5/02 |
| 2007/0157484 A1 * | 7/2007 | Grubler | ..................... | B25B 7/00 33/679.1 |
| 2009/0288308 A1 * | 11/2009 | Hsieh | ..................... | B25B 13/04 33/810 |
| 2016/0169654 A1 * | 6/2016 | Howard | ................... | G01B 3/20 33/783 |
| 2016/0341534 A1 * | 11/2016 | Joy | ......................... | G01B 3/20 |

* cited by examiner

*Primary Examiner* — Brad Bennett
(74) *Attorney, Agent, or Firm* — One LLP

(57) ABSTRACT

Systems, devices, and methods are provided for quickly and accurately measuring fastener sizes as disclosed.

19 Claims, 23 Drawing Sheets

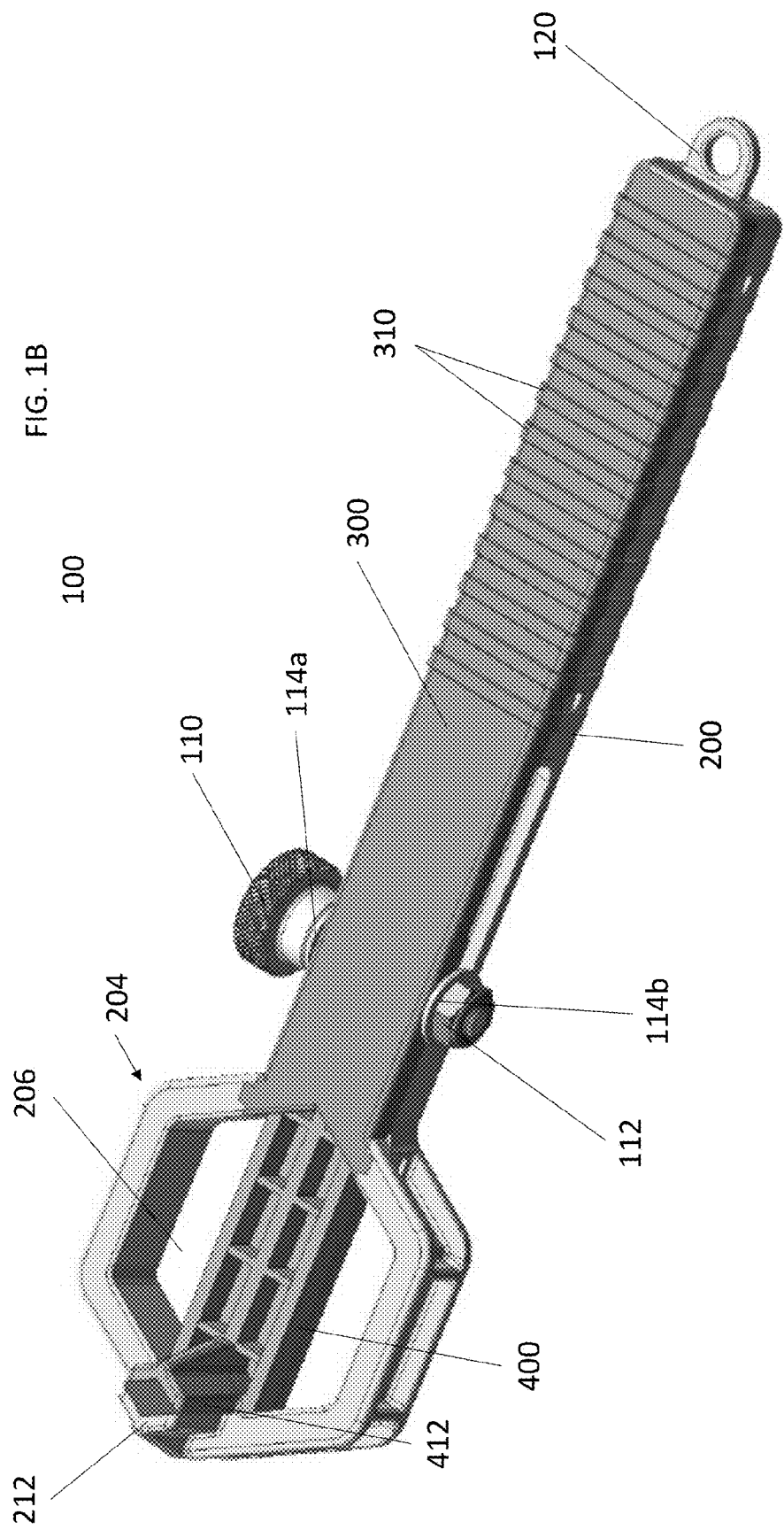

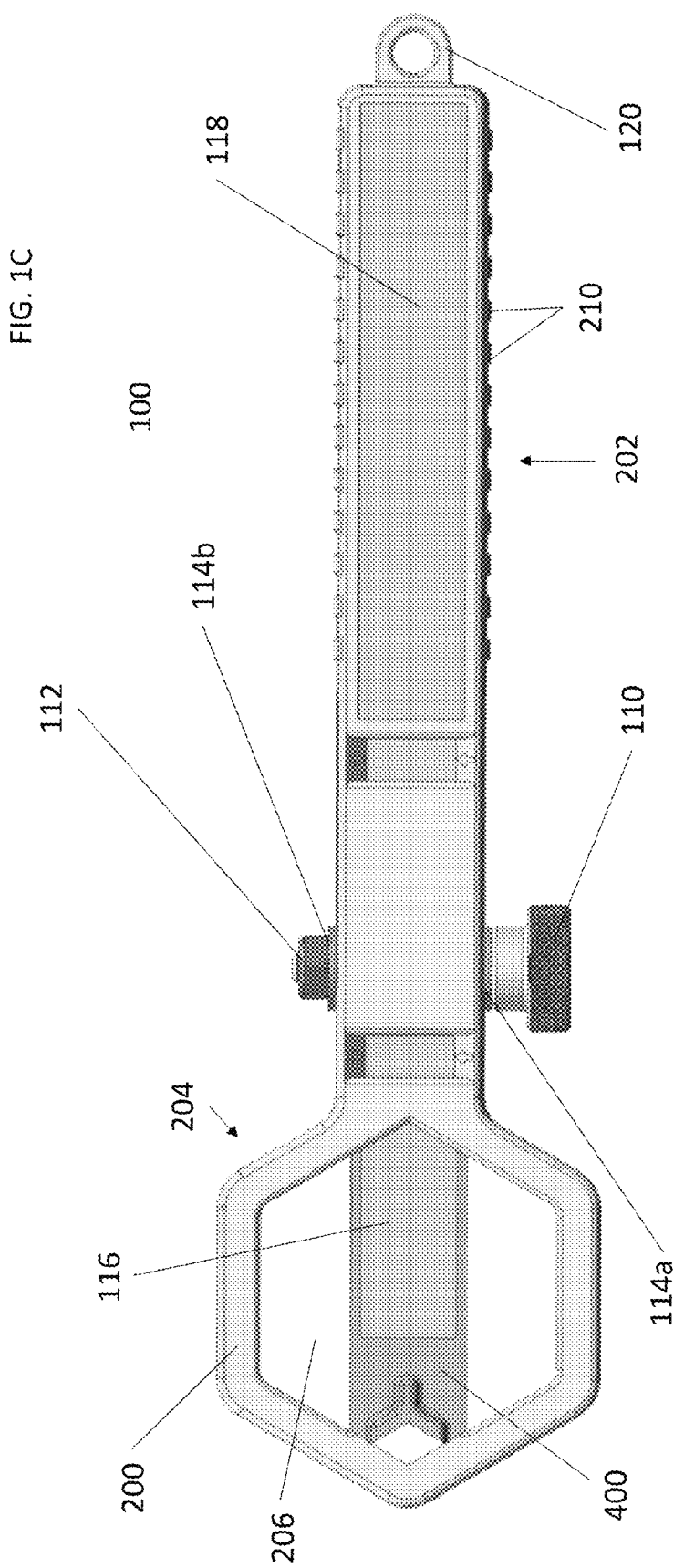

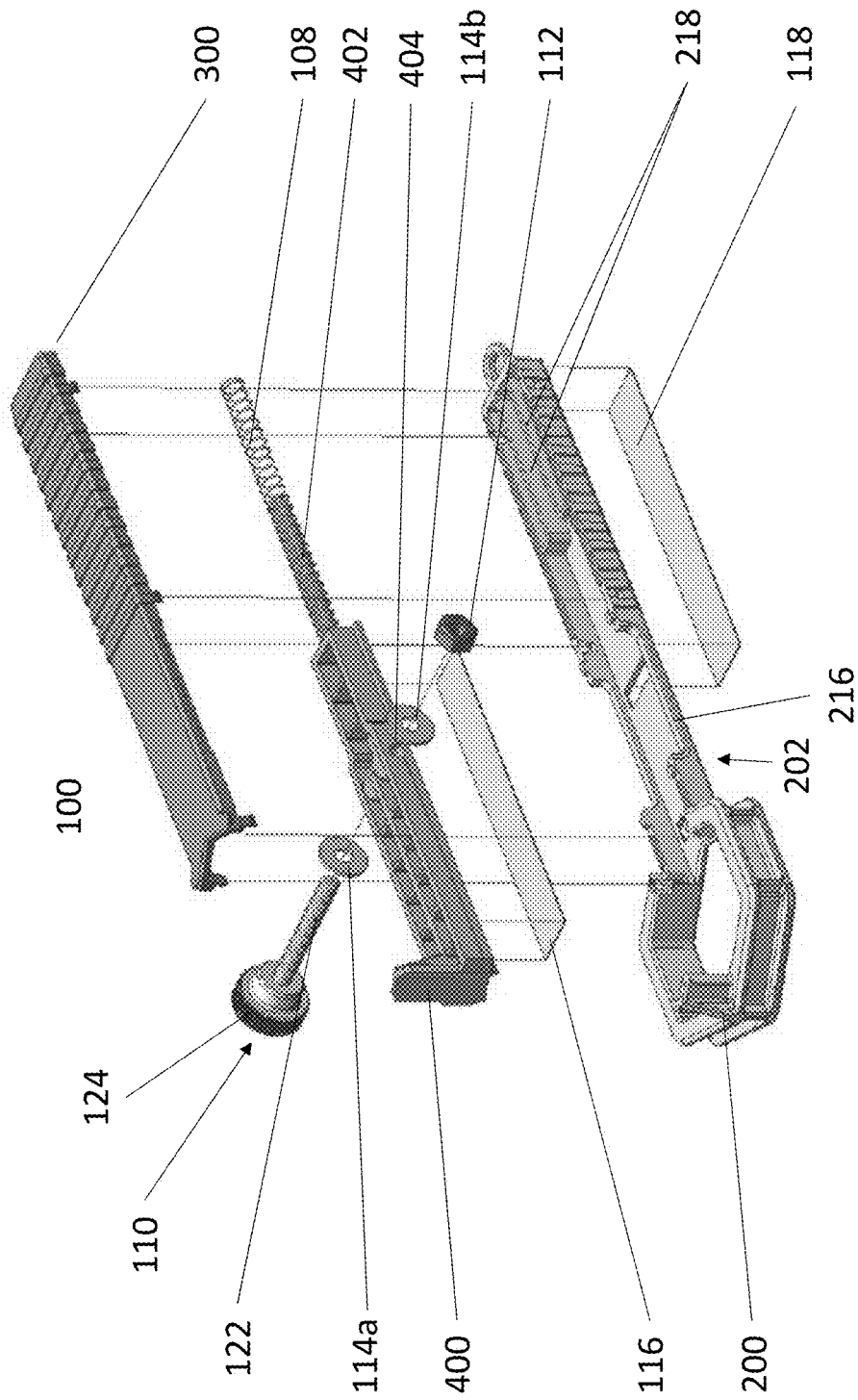

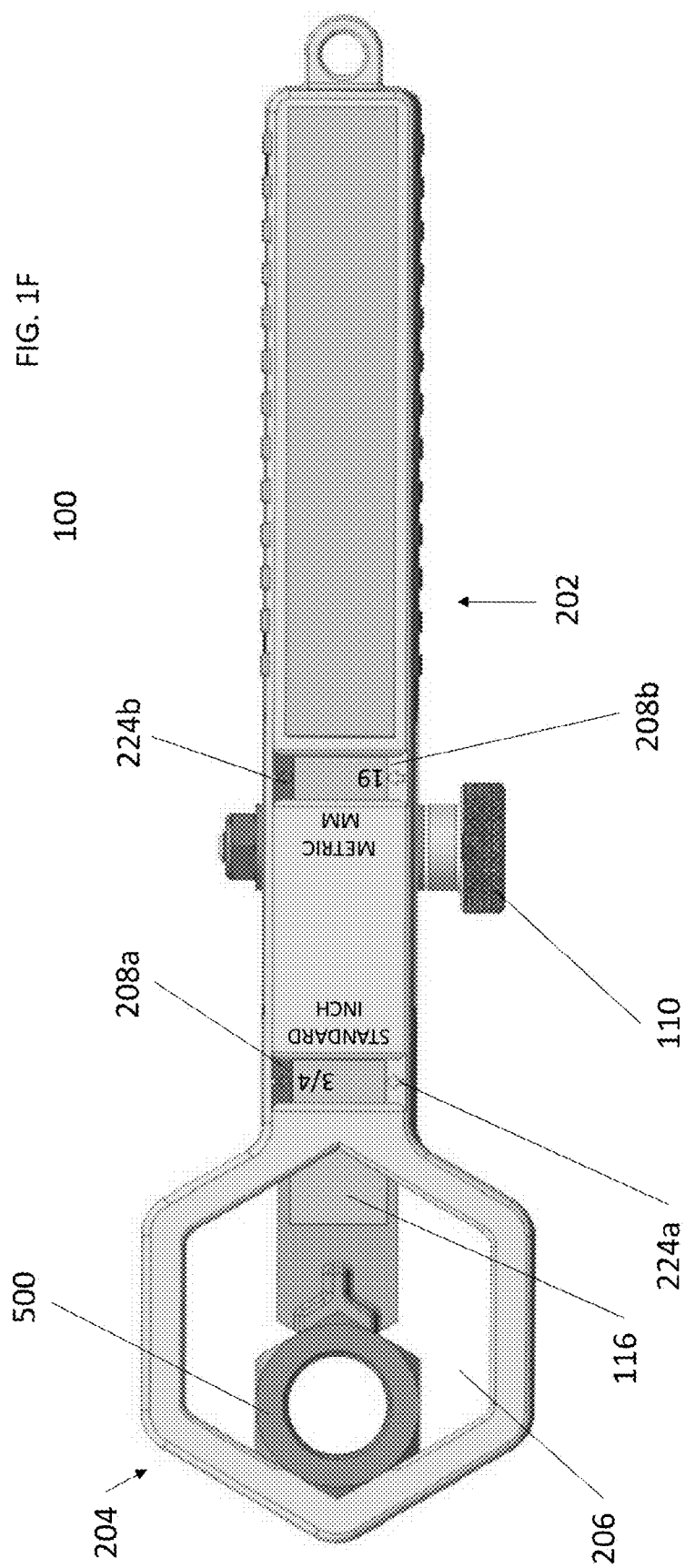

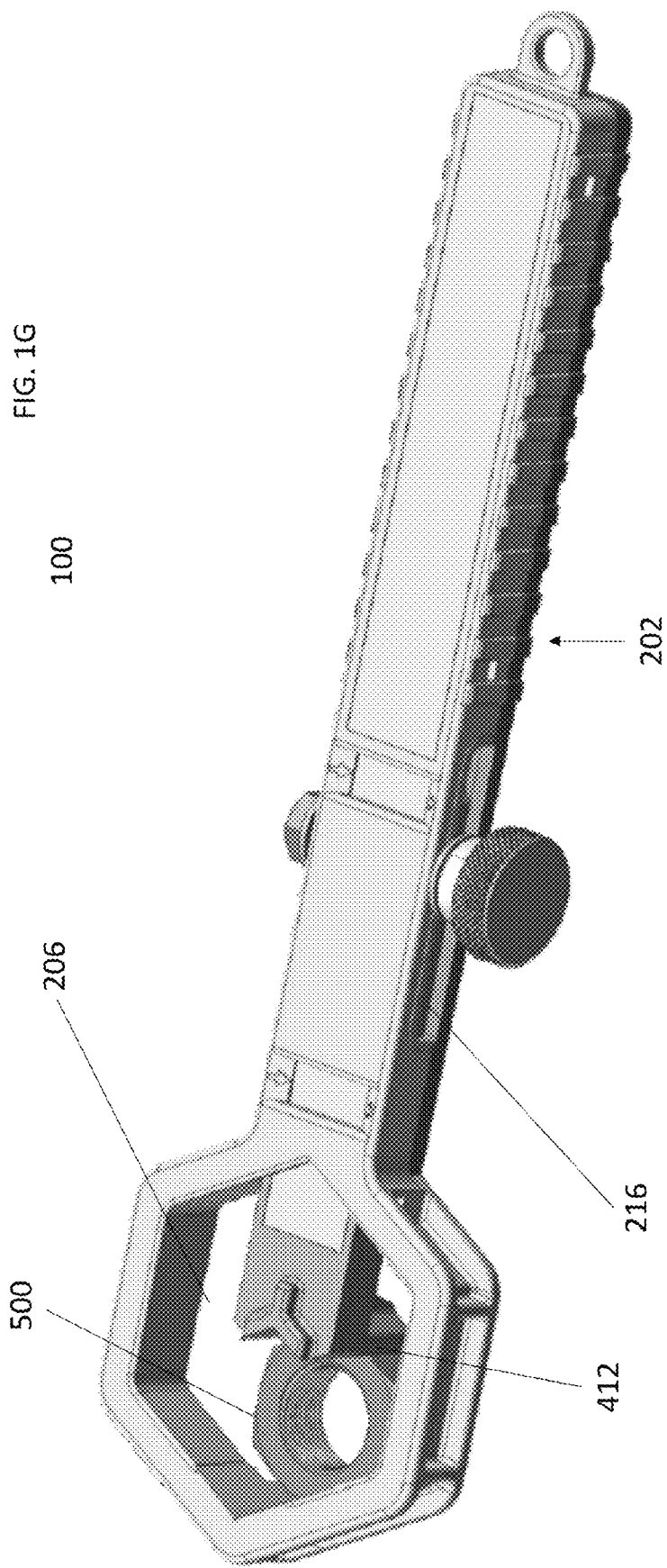

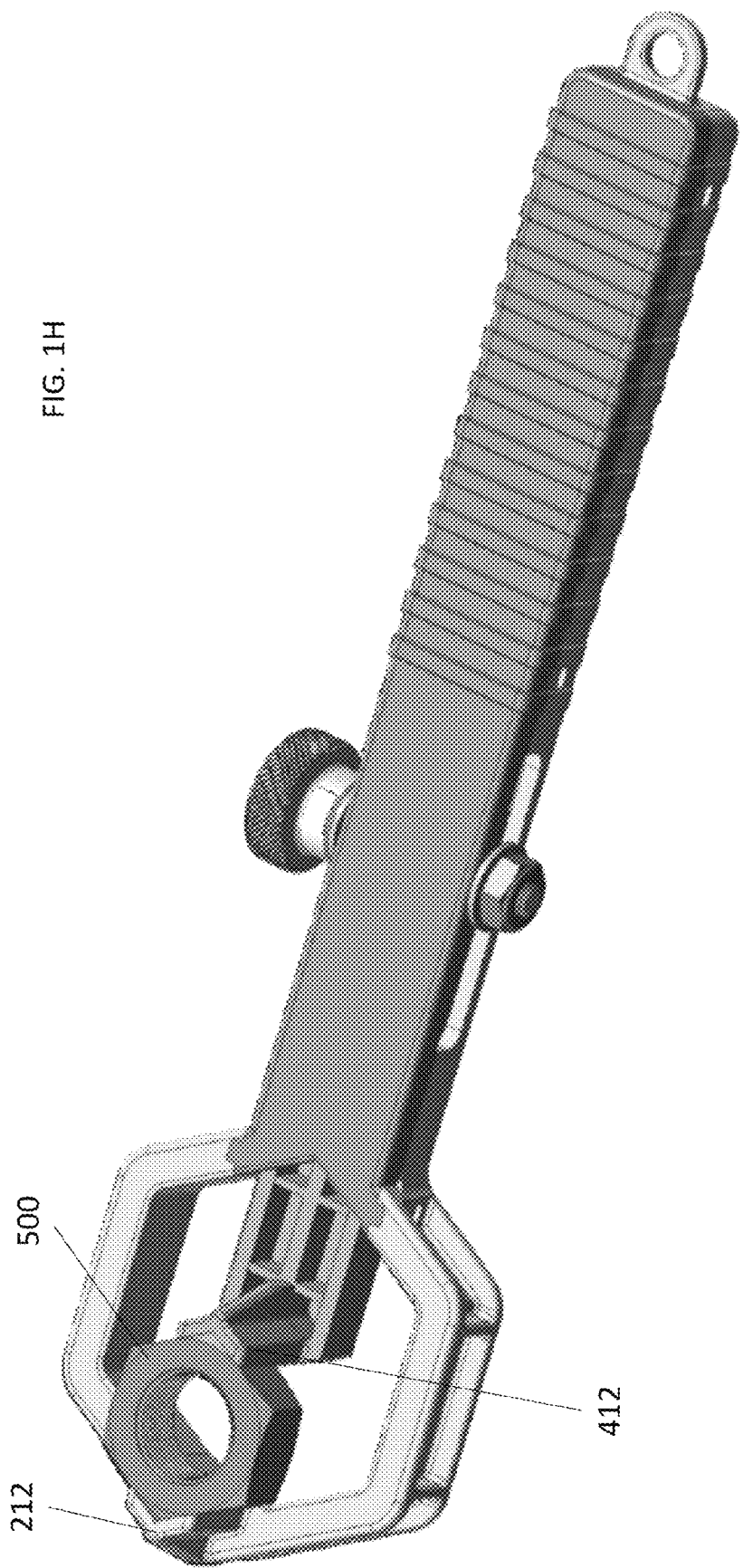

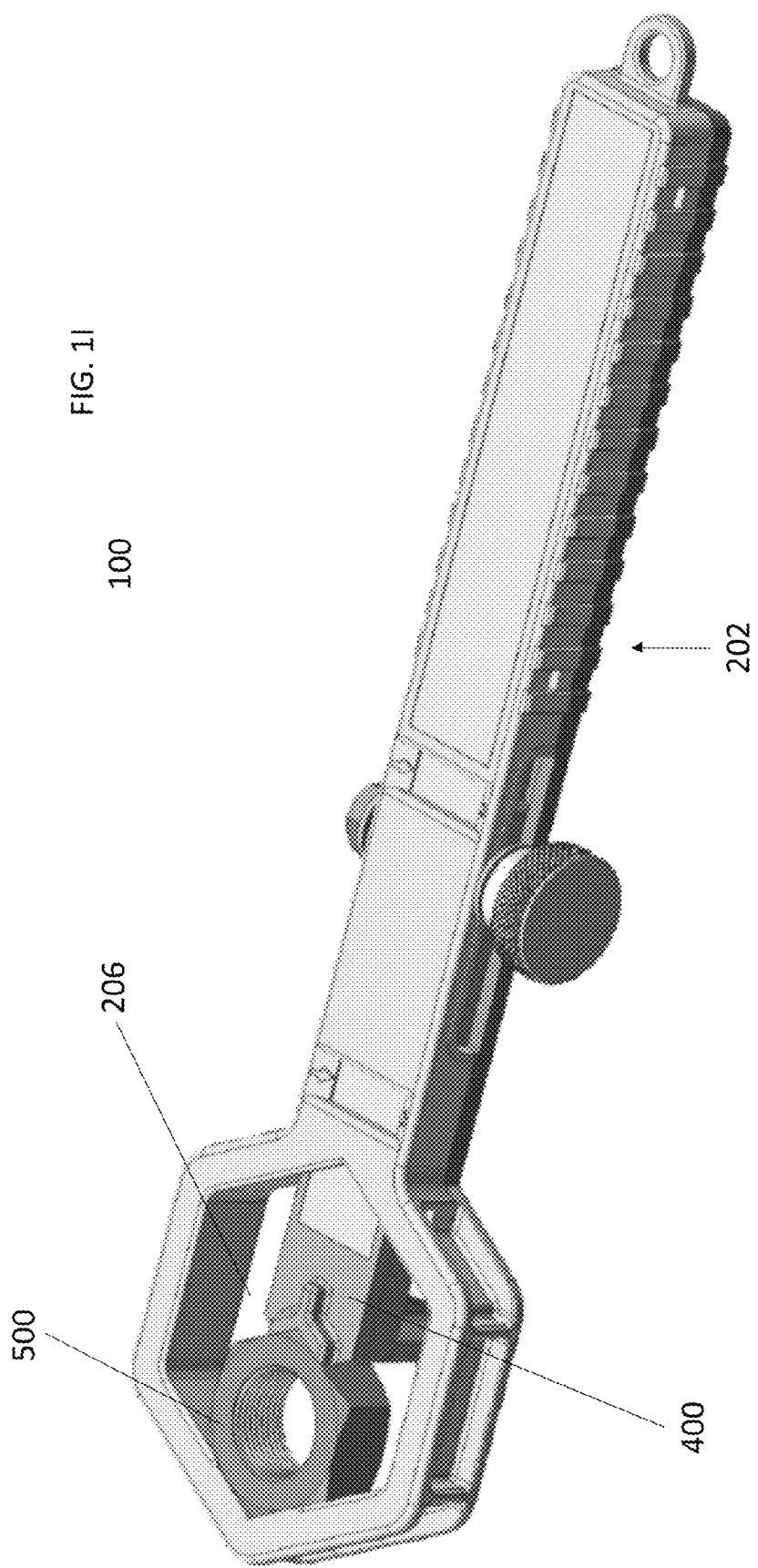

100

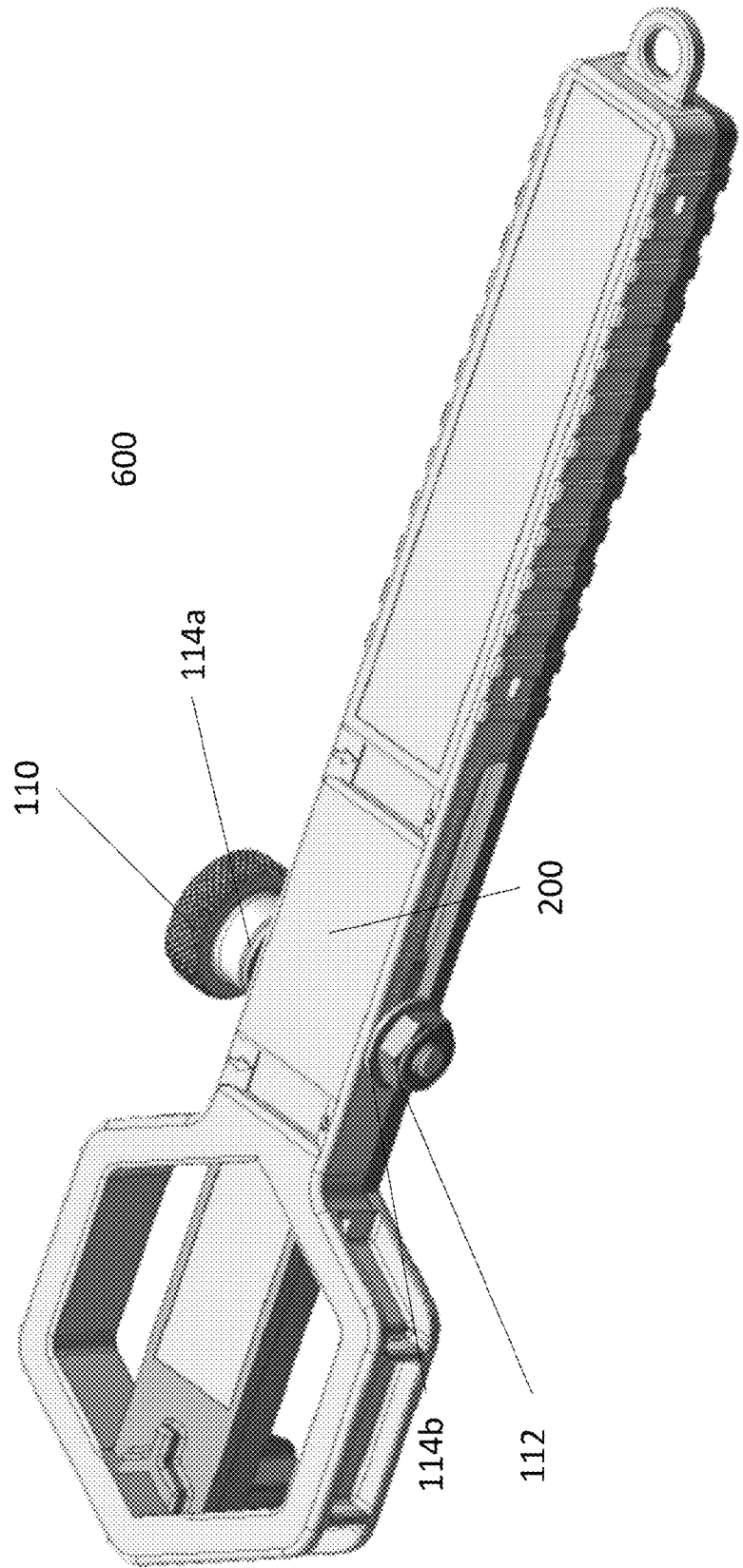

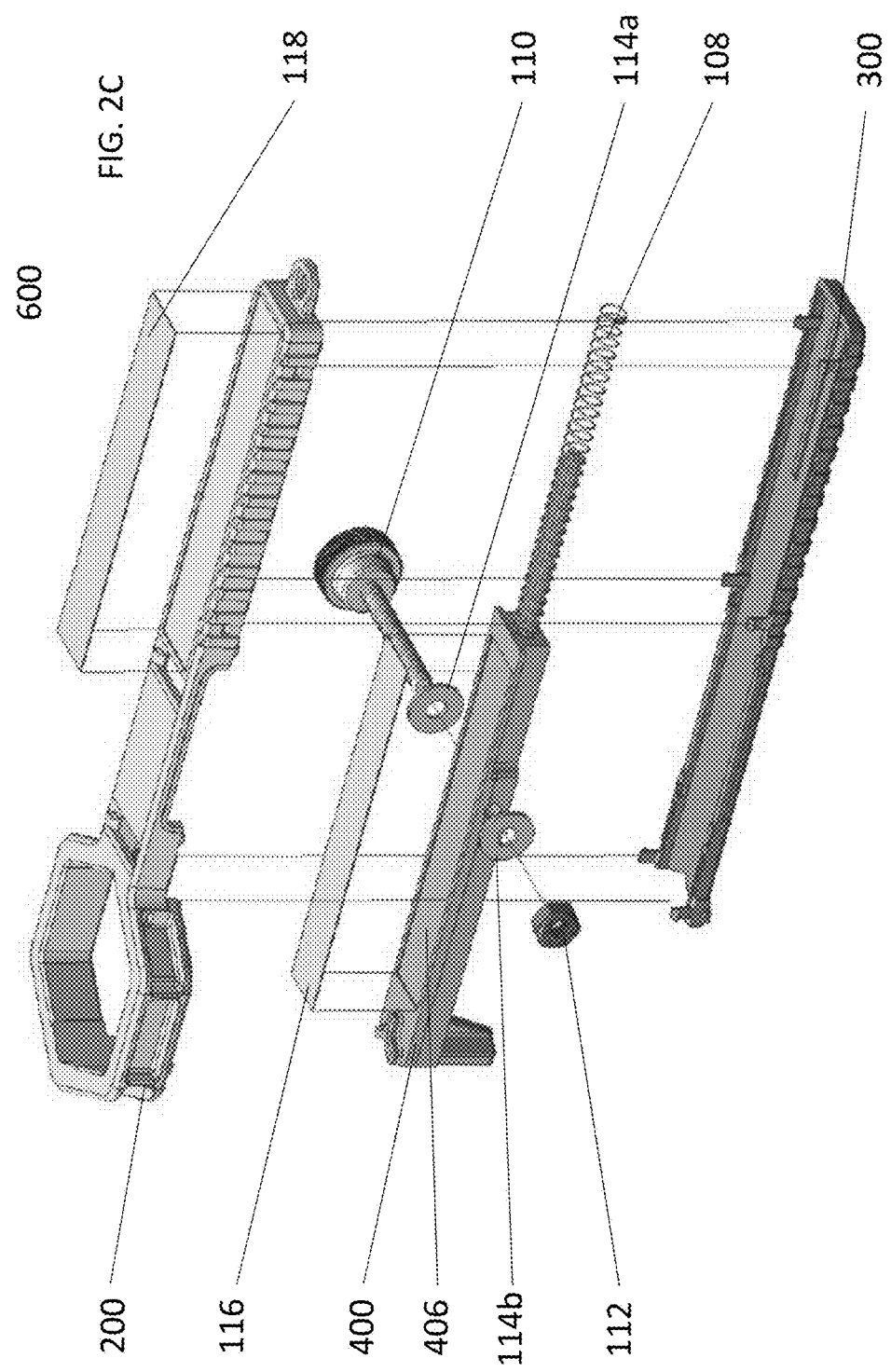

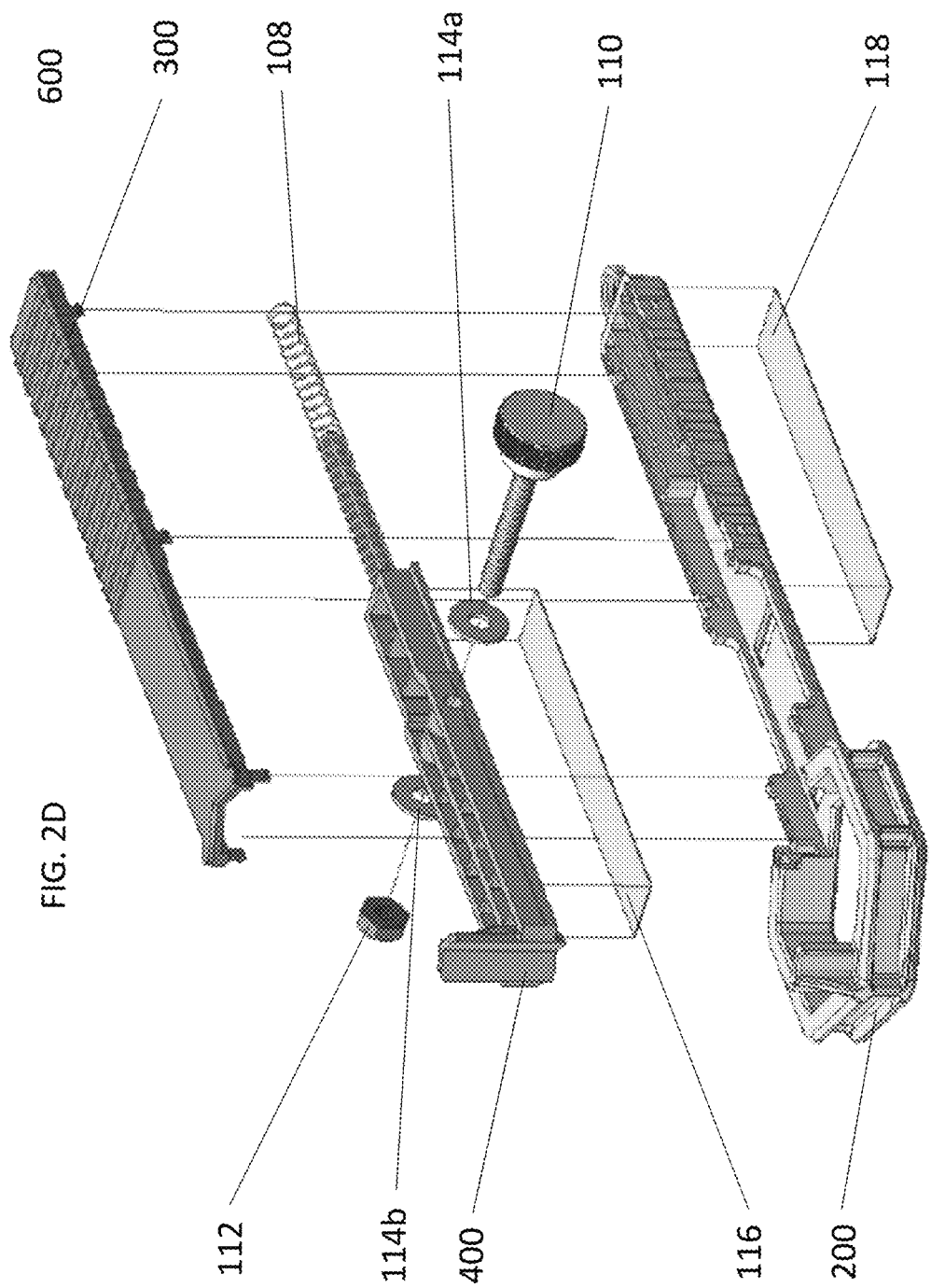

| # | INCH | Max WAF | Min WAF | Max WAC | Min WAC | Bar Width | Upper Decal Point | Lower Decal Point |
|---|------|---------|---------|---------|---------|-----------|-------------------|-------------------|
| 1 | 1/4 | 0.2500 | 0.2410 | 0.289 | 0.278 | 0.010 | 1.6183 | 1.6287 |
| 2 | 9/32 | 0.2813 | 0.2710 | 0.325 | 0.313 | 0.012 | 1.582 | 1.594 |
| 3 | 5/16 | 0.3125 | 0.3020 | 0.361 | 0.349 | 0.012 | 1.546 | 1.558 |
| 4 | 11/32 | 0.3438 | 0.3320 | 0.397 | 0.383 | 0.014 | 1.510 | 1.524 |
| 5 | 3/8 | 0.3750 | 0.3620 | 0.433 | 0.418 | 0.015 | 1.474 | 1.489 |
| 6 | 7/16 | 0.4375 | 0.4230 | 0.505 | 0.488 | 0.017 | 1.402 | 1.419 |
| 7 | 1/2 | 0.5000 | 0.4844 | 0.577 | 0.559 | 0.018 | 1.330 | 1.348 |
| 8 | 9/16 | 0.5625 | 0.5438 | 0.650 | 0.628 | 0.022 | 1.257 | 1.279 |
| 9 | 5/8 | 0.6250 | 0.6031 | 0.722 | 0.696 | 0.025 | 1.1853 | 1.2106 |
| 10 | 11/16 | 0.6875 | 0.6656 | 0.794 | 0.769 | 0.025 | 1.113 | 1.138 |
| 11 | 3/4 | 0.7500 | 0.7250 | 0.866 | 0.837 | 0.029 | 1.041 | 1.070 |
| 12 | 13/16 | 0.8125 | 0.7844 | 0.938 | 0.906 | 0.032 | 0.969 | 1.001 |
| 13 | 7/8 | 0.8750 | 0.8469 | 1.010 | 0.978 | 0.032 | 0.897 | 0.929 |
| 14 | 15/16 | 0.9375 | 0.9063 | 1.083 | 1.047 | 0.036 | 0.824 | 0.860 |
| 15 | 1 | 1.0000 | 0.9656 | 1.155 | 1.115 | 0.040 | 0.752 | 0.792 |
| 16 | 1 1/16 | 1.0625 | 1.0281 | 1.227 | 1.187 | 0.040 | 0.680 | 0.720 |
| 17 | 1 1/8 | 1.1250 | 1.0875 | 1.299 | 1.256 | 0.043 | 0.608 | 0.651 |
| 18 | 1 3/16 | 1.1875 | 1.1469 | 1.371 | 1.324 | 0.047 | 0.536 | 0.583 |
| 19 | 1 1/4 | 1.2500 | 1.2094 | 1.443 | 1.398 | 0.047 | 0.464 | 0.511 |
| 20 | 1 5/16 | 1.3125 | 1.2688 | 1.516 | 1.465 | 0.050 | 0.3915 | 0.4419 |
| 21 | 1 3/8 | 1.3750 | 1.3281 | 1.588 | 1.534 | 0.054 | 0.319 | 0.373 |
| 22 | 1 7/16 | 1.4375 | 1.3906 | 1.660 | 1.606 | 0.054 | 0.247 | 0.301 |
| 23 | 1 1/2 | 1.5000 | 1.4500 | 1.732 | 1.674 | 0.058 | 0.175 | 0.233 |

702 → INCH
704 → Max WAF
706 → Min WAF
708 → Max WAC
710 → Min WAC
712 → Bar Width
714 → Upper Decal Point
716 → Lower Decal Point

| MM | | Max WAF | Min WAF | Max WAC | Min WAC | Bar Width | Upper Decal Point | Lower Decal Point |
|---|---|---|---|---|---|---|---|---|
| 6 | 5.82 | 0.2362 | 0.2291 | 0.273 | 0.265 | 0.008 | 3.384 | 3.392 |
| 7 | 6.78 | 0.2756 | 0.2669 | 0.318 | 0.308 | 0.010 | 3.339 | 3.349 |
| 8 | 7.78 | 0.3150 | 0.3063 | 0.364 | 0.354 | 0.010 | 3.293 | 3.303 |
| 9 | 8.78 | 0.3543 | 0.3457 | 0.409 | 0.399 | 0.010 | 3.248 | 3.258 |
| 10 | 9.78 | 0.3937 | 0.3850 | 0.455 | 0.445 | 0.010 | 3.202 | 3.212 |
| 11 | 10.73 | 0.4331 | 0.4224 | 0.500 | 0.488 | 0.012 | 3.157 | 3.169 |
| 12 | 11.73 | 0.4724 | 0.4618 | 0.546 | 0.533 | 0.012 | 3.1115 | 3.1237 |
| 13 | 12.73 | 0.5118 | 0.5012 | 0.591 | 0.579 | 0.012 | 3.066 | 3.078 |
| 14 | 13.73 | 0.5512 | 0.5406 | 0.636 | 0.624 | 0.012 | 3.021 | 3.033 |
| 15 | 14.73 | 0.5906 | 0.5799 | 0.682 | 0.670 | 0.012 | 2.975 | 2.987 |
| 16 | 15.73 | 0.6299 | 0.6193 | 0.727 | 0.715 | 0.012 | 2.930 | 2.942 |
| 17 | 16.73 | 0.6693 | 0.6587 | 0.773 | 0.761 | 0.012 | 2.884 | 2.896 |
| 18 | 17.73 | 0.7087 | 0.6980 | 0.818 | 0.806 | 0.012 | 2.839 | 2.851 |
| 19 | 18.87 | 0.7480 | 0.7350 | 0.864 | 0.849 | 0.015 | 2.793 | 2.808 |
| 20 | 19.67 | 0.7874 | 0.7744 | 0.909 | 0.894 | 0.015 | 2.748 | 2.763 |
| 21 | 20.67 | 0.8268 | 0.8138 | 0.955 | 0.940 | 0.015 | 2.702 | 2.717 |
| 22 | 21.67 | 0.8661 | 0.8531 | 1.000 | 0.985 | 0.015 | 2.657 | 2.672 |
| 23 | 22.67 | 0.9055 | 0.8925 | 1.046 | 1.031 | 0.015 | 2.611 | 2.626 |
| 24 | 23.67 | 0.9449 | 0.9319 | 1.091 | 1.076 | 0.015 | 2.566 | 2.581 |
| 25 | 24.67 | 0.9843 | 0.9713 | 1.137 | 1.122 | 0.015 | 2.520 | 2.535 |
| 26 | 25.67 | 1.0236 | 1.0106 | 1.182 | 1.167 | 0.015 | 2.475 | 2.490 |
| 27 | 26.67 | 1.0630 | 1.0500 | 1.227 | 1.212 | 0.015 | 2.430 | 2.445 |
| 28 | 27.67 | 1.1024 | 1.0894 | 1.273 | 1.258 | 0.015 | 2.384 | 2.399 |
| 29 | 28.67 | 1.1417 | 1.1287 | 1.318 | 1.303 | 0.015 | 2.339 | 2.354 |
| 30 | 29.16 | 1.1811 | 1.1480 | 1.364 | 1.326 | 0.038 | 2.293 | 2.331 |
| 32 | 31.08 | 1.2598 | 1.2205 | 1.455 | 1.409 | 0.045 | 2.2023 | 2.2477 |
| 34 | 33.08 | 1.3386 | 1.2992 | 1.546 | 1.500 | 0.045 | 2.1113 | 2.1566 |
| 36 | 35.08 | 1.4173 | 1.3780 | 1.637 | 1.591 | 0.045 | 2.0204 | 2.0659 |

FIG. 4C

FASTENER SIZE MEASUREMENT TOOL

CROSS REFERENCE TO RELATED APPLICATIONS

The description provided herein is related to U.S. Provisional Application Ser. No. 61/842,028, filed Jul. 2, 2013, which is hereby incorporated by reference in its entirety and for all purposes.

FIELD

The subject matter described herein relates generally to systems, devices, and methods for determining a proper fastener size measurement as well as correctly sized tooling for each individual fasteners' installation or removal.

BACKGROUND

Hexagonal and other polygonal headed fasteners, commonly known as nuts and bolts, are used across many industries for various applications. When working with these fasteners, wrenches and/or sockets are required for their installation and removal. With a wide array of sizes and a lack of indication on nuts and bolts specifying their exact size, the most common practice in determining an appropriate tool size is to guess using visual estimation. This leads to a myriad of problems.

Guessing an appropriate wrench size is inefficient and difficult to do correctly, even for the most experienced technicians. Most people who have worked with nuts and bolts have experienced the frustration of making an incorrect wrench selection. Taking automotive repair as an example, frustration can build when an incorrect wrench is repeatedly selected, requiring an individual to exit and re-enter an uncomfortable or awkward position commonly associated with repairs, such as under an automobile.

There are two standard units of measurements used in fastener fabrication, Standard (Inch) and Metric (mm). With a growing global economy and increased prevalence of outsourcing, it is becoming more common to see metric fasteners in the United States. Since the global economy has made trade of industrial goods more prevalent, technicians and the general public must now be more comfortable with metric fasteners in addition to the historically popular standard inch dimensions. The dual measurement system has caused more confusion than ever due to the increased number of nut and bolt sizes. With the increased prevalence of metric fasteners, individuals may unwittingly select a standard inch wrench when a metric fastener is required. This can lead to stripping the head of the nut or bolt, injury from wrench slipping, frustration and major inefficiency in completing a task.

Previous attempts at solving these problems have included designs such as that shown in U.S. Pat. No. 7,373,735. However, many of these are more conceptual that actually functional in the industries in which they were intended for. They are more expensive, and not as simplistic and intuitive as they could be. Additionally, they do not maintain an accurate size fastener size after being moved away from a fastener. Further, they measure from one flat side of a fastener to an opposing flat side, which can make measuring more difficult and further, are not biased against the fastener measurement location which can lead to problems with accuracy.

Thus, needs exist for improved techniques by which to accurately gauge the size of fasteners such as nuts and bolts.

SUMMARY

Provided herein are embodiments of systems, devices and methods for determining a proper fastener, nut and bolt size measurements using a handheld mechanical gauge that accurately measures dimensions of fastener heads. By determining this dimension, the user of the mechanical gauge can efficiently and effectively acquire the correct size wrench for use with a particular fastener.

Another benefit of the systems, devices and methods described herein is that in certain circumstances, a metric wrench may have overlapping dimensions in which a standard wrench can be used interchangeably. If a wrench is missing or unowned, a proper wrench may still be used based on the overlapping dimensions. For example, a ¾" wrench and 19 mm wrench can be used interchangeably.

Due to the ubiquity of fasteners such as nuts and bolts in modern mechanical systems, the industries in which the devices disclosed herein are useful is nearly limitless. For example, industrial applications in manufacturing plants, parents fixing children's bicycles, motorcycle repair shops, fire hydrant release valves, plumbing, heating, cooling, the automotive industry and numerous other industries.

The configuration of the devices described herein in detail are only example embodiments and should not be considered limiting. Other systems, devices, methods, features and advantages of the subject matter described herein will be or will become apparent to one with skill in the art upon examination of the following figures and detailed description. It is intended that all such additional systems, devices, methods, features and advantages be included within this description, be within the scope of the subject matter described herein, and be protected by the accompanying claims. In no way should the features of the example embodiments be construed as limiting the appended claims, absent express recitation of those features in the claims.

BRIEF DESCRIPTION OF THE FIGURES

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

FIG. 1B is a bottom perspective view of an example embodiment of a fastener measurement tool.

FIG. 1C is an assembled top view depicting an example embodiment of the device.

FIG. 1E is an exploded perspective view of an example embodiment from a bottom-up angle.

FIG. 1F is a top view of an example embodiment of a fastener measurement tool with fastener.

FIG. 1G is a top perspective view of an example embodiment with a fastener in a first position.

FIG. 1H is a bottom perspective view of an example embodiment with a fastener in a first position.

FIG. 1I is a top perspective view of an example embodiment with a fastener in a second position.

FIG. 2A is a top perspective view of an example embodiment of a fastener measurement tool.

FIG. 2C is an exploded perspective view of an example embodiment from a top-down angle.

FIG. 2D is an exploded perspective view of an example embodiment from a bottom-up angle.

FIG. 4B is an example embodiment of a table with inch measurements.

FIG. 4C is an example embodiment of a table with metric measurements.

DETAILED DESCRIPTION

Before the present subject matter is described in detail, it is to be understood that this disclosure is not limited to the particular embodiments described, as such may, of course, vary. It is also to be understood that the terminology used herein is for the purpose of describing particular embodiments only, and is not intended to be limiting, since the scope of the present disclosure will be limited only by the appended claims.

Figure 1A:
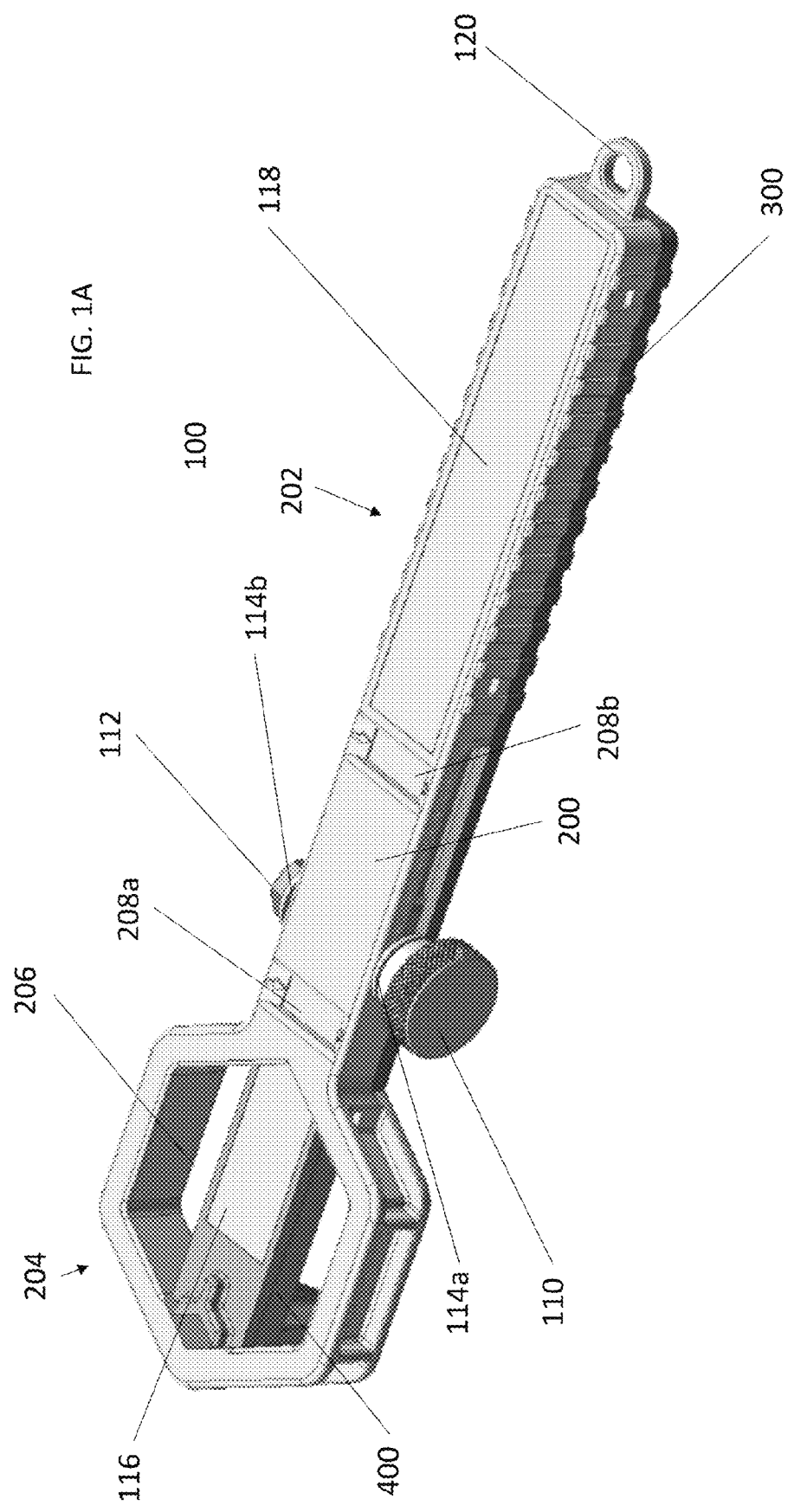
FIG. 1A is a top perspective view of an example embodiment of a fastener measurement tool.

FIG. 1A is a perspective view of an example embodiment of a fastener measurement tool 100. In the example embodiment a body 200 includes a handle or sliding shaft guide 202 with a partially hollow interior and a head 204 with a sizing passthrough 206. Back plate 300 is coupled with sliding shaft guide 202 of body 200 such that sliding shaft 400 is housed within the partially hollow interior of sliding shaft guide 202 and can slide into sizing passthrough 206 from a side. A screw 110 can be coupled with a retaining nut 112 through sides of sliding shaft 400. Screw 110 and retaining nut 112 can have their interior surfaces separate from body 200 with washers 114a, 114b in between, in order to maintain a position of sliding shaft 400 with respect to body 200. Sliding shaft 400 can include an adhered bar scale decal 116 that can display at least one measurement size through at least one window 208a, 208b. A product information decal 118 can be adhered to a surface of sliding shaft guide 202. Body 200 can include a retainer 120 which can be used to attach a carrier strap for looping a carrying cord through so a user can wear the device on a wrist, around a neck or otherwise, to keep it on-hand at all times.

Device 100 can be made of various appropriate materials. In an example embodiment, Polypropylene LFT PP-50L GF/001 UV plastic can be used for all components with the exception of: Screw 110 which can be an aluminum thumbscrew with anodized finish, Washers 114a and 114b which can be steel, aluminum or nylon washers, Retaining nut 112 which can be a steel Nylock nut that can have a galvanized, zinc, powder-coated or black-oxide finish, Spring 108 which can be a steel spring either made of music wire or stainless steel, and Decals 116 and 118 can be labels made from a film adhesive material like polyester or vinyl.

FIG. 1B is a bottom perspective view of an example embodiment of a fastener measurement tool. In the example embodiment back plate grip features 310 can be ridges, depressions, cross-hatches, bumps, nubs, or other features which enhance a user's grip of the device. This can be beneficial in environments where there may be grease, oil or other slippery substances which make it difficult to hold the device. Body protrusion 212 can be an extension from the bottom side of head 204 which can align with a sliding shaft protrusion 412 which can be an extension from the bottom side of sliding shaft 400. These protrusions can allow access to restricted areas, such as a lug nut which holds a wheel on an automobile. Lug nuts are usually recessed in a counterbore fashion in which the protrusions 212 and 412 can be utilized to acquire said measurement.

FIG. 1C is an assembled top view depicting an example embodiment of the device. In the example embodiment, sliding shaft guide 202 can include body grip features 210. Body grip features 210 can be ridges, depressions, crosshatches, bumps, nubs, or other features which enhance a user's grip of the device. This can be beneficial in environments where there may be grease, oil or other slippery substances which make it difficult to hold the device. Body grip features 210 can align with back plate grip features 310 in some embodiments, while in other embodiments they may not. Screw 110 can be loosened with respect to retaining nut 112 in order to move sliding shaft 400 with respect to body 200. In some embodiments, screw 110 and retaining nut 112 can be maintained at a particular rotational position with respect to each other which is tight enough that it maintains position while loose enough that it can be slid side to side with respect to body 200. Screw 110 can have a home position in which it is unlocked. When screw 110 is turned 180 degrees in either a counter-clockwise or clockwise direction, it can enter a locked position and hold a designated fastener dimension in windows 208a and 208b even if the hex fastener is left behind or otherwise removed.

Figure 1D:
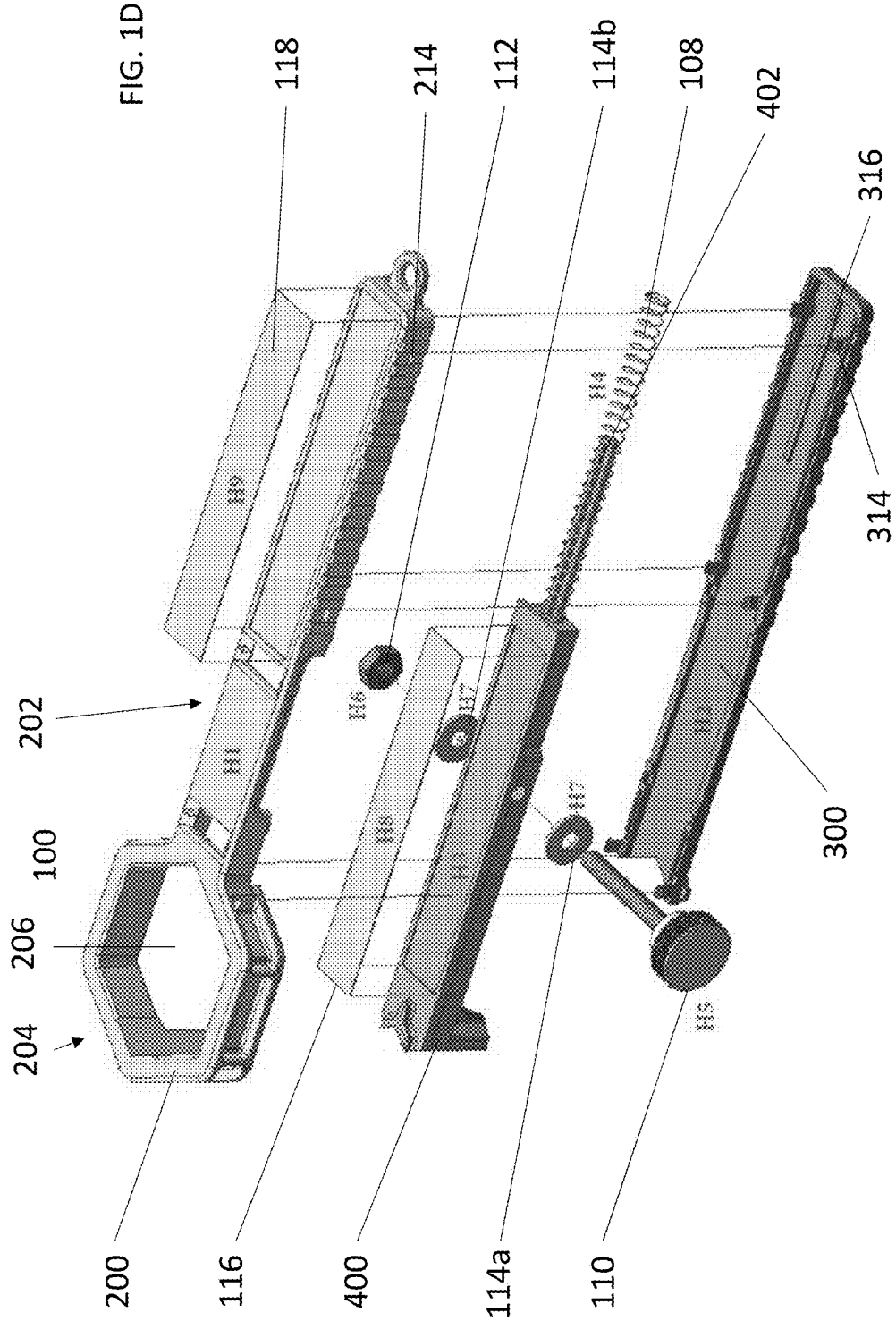
FIG. 1D is an exploded perspective view of an example embodiment from a top-down angle.

Screw 110 can be a specialized screw, called a "thumbscrew." It can be provide a location where a user's thumb may rests while adjusting or otherwise "pulling back" sliding shaft 400 against a compression spring 108 with respect to the sliding shaft guide 202 (e.g. see FIGS. 1D, 1E). Screw 110 can also turn circumferentially with respect to its central axis. For instance, in some embodiments screw 110 can turn 180 degrees in either direction to lock a position of measurement, allowing a user to read a measurement without a nut or bolt present within a pass-through 206. This can be a useful feature for bolts that are difficult to reach or in dark or dimly lit areas. The bolt can be measured, screw 110 locked and the entire device can be removed from the area for a user to make a measurement reading in a more convenient location or at a later time.

FIG. 1D is an exploded perspective view of an example embodiment from a top-down angle. In the example embodiment, interior features of device 100 are shown. A retaining extension 402 of sliding shaft 400 can be a portion of sliding shaft 400 which fits within a circumference and along a central axis of a compression spring 108. The compression spring 108 can be compressed when a user moves a screw 110 with respect to body 200 which is coupled with sliding shaft 400 and will maintain a position of sliding shaft 400 with respect to a fastener being measured in passthrough 206. A ridge 316 on an inner surface of back plate 300 can provide a surface against which spring 108 can push against and maintain spring 108 in position during compression without buckling to one side or another. This is done in conjunction with inner walls 218 of sliding shaft guide 202, shown in FIG. 1E and described below.

Back plate 300 can be coupled with sliding shaft guide 202 by insertion of at least one clips 314 of back plate 300 into complementary windows 214 of sliding shaft guide 202. In the example embodiment six such clips 314 and windows 214 are shown although more or less can be used in various embodiments. Additionally, windows 214 can be on interior surfaces of sliding shaft guide 202 and thus not visible to users in some embodiments. In alternative embodiments, windows can be part of back plate 300 while clips can be part of sliding shaft guide 202. Other sealing features are contemplated including screws, adhesives and others.

FIG. 1E is an exploded perspective view of an example embodiment from a bottom-up angle. In the example embodiment inner walls 218 of sliding shaft guide 202, as mentioned above, are shown. Inner walls 218 can prevent spring 108 from shifting, buckling or compressing other than substantially along its central axis. While one end of spring 108 contacts a surface of sliding shaft 400, the opposing end of spring 108 contacts an inner surface of sliding shaft guide 202. In the example embodiment this is the main surface against which spring 108 is compressed. In some embodiments a retaining extension of sliding shaft guide 202 (similar to retaining extension 402 but not shown) can maintain a position of spring 108 opposite retaining extension 402, including its central axis.

Screw 110 has a shank 122 which passes through first washer 114*a*, hole 404 in sliding shaft 400, second washer 114*b* and is coupled with a retaining nut 112, for instance using threading. In the example embodiment, hole 404 is threaded to specification 10-24. Retaining nut 112 can serve two purposes. First, it can retain screw 110 in position and prevent it from falling out or otherwise become disengaged from hole 404. Second, it can be specifically torqued to a required tolerance such that screw 110 can only turn 360 degrees total and create a lock function in either 180 degree direction. Channels 216 of sliding shaft guide 202 can be cutouts on either side of sliding shaft guide 202 with opposing ends that is wide enough to allow for the diameter of a shank 122 of screw 110 to slide from one end of the cutout to the other, uninterrupted. Screw 110 has a head 124 with a grip portion which a user can easily adjust, even with greasy or oily fingers. The grip portion can be created by knurling the head 124 of screw 110

FIG. 1F is a top view of an example embodiment of a fastener measurement tool with fastener 500. Passthrough 206 is a location where the device can be placed around fastener 500 with sliding shaft 400 pulled away from a facing surface of head 204 under the compression of spring 108. Sliding shaft 400 can then be positioned such that it contacts fastener 500 on one corner while head 204 contacts fastener 500 on an opposite corner. Passthrough 206 can have dimensions of 1.750 inches wide. In some embodiments hex fasteners up to 1½" and 36 mm can be measured, corresponding with the two largest dimensions on a barscale of scale decal 116. In some embodiments hex fasteners down to ¼" and 6 mm can be measured, corresponding with the two smallest dimensions on a barscale of scale decal 116.

Particular positions of screw 110 with respect to sliding shaft guide 202 cause corresponding display of accurate measurements of fastener size on scale decal 116 in at least one of windows 208*a*, 208*b*. For example, window 208*a* can show metric measurement sizes while window 208*b* can show standard measurement sizes. Alternatively, as shown in FIG. 1F, window 208*a* can show standard measurement sizes while window 208*b* can show metric measurement sizes. Indicators 224*a*, 224*b* such as arrows, lines, dashes or others can accurately indicate which particular measurement is correct in instances where measurements are particularly close and more than one may be visible in a window 208*a*, 208*b*.

FIG. 1G is a top perspective view of an example embodiment with a fastener in a first position. In the example embodiment fastener 500 can be in a location which is difficult to reach. As such, protrusion 412 can be beneficial along with protrusion 212 in measuring the size of fastener 500. For instance, fastener 500 could be installed in a location where it is surrounded by walls and a deep socket with a ratchet or an extension is required to install or remove it. As such, it may be impossible to align passthrough 206 around fastener 500. However, protrusions 212, 412 allow a user to measure the size of fastener 500 without having to insert fastener into passthrough 206.

FIG. 1H is a bottom perspective view of an example embodiment with a fastener in a first position. In the example embodiment, fastener 500 is shown as being beyond a standard plane of the device where passthrough 206 is in line with sliding shaft guide 202, as can be appreciated with respect to FIG. 1G above as well.

FIG. 1I is a top perspective view of an example embodiment with a fastener in a second position. In the example embodiment, fastener 500 is within the main plane of the device, such that it is located inside passthrough 206. This can be beneficial, for instance, if a user picks up a fastener and wants to measure it but it is not located in a difficult to reach location as described above.

Figure 1J:
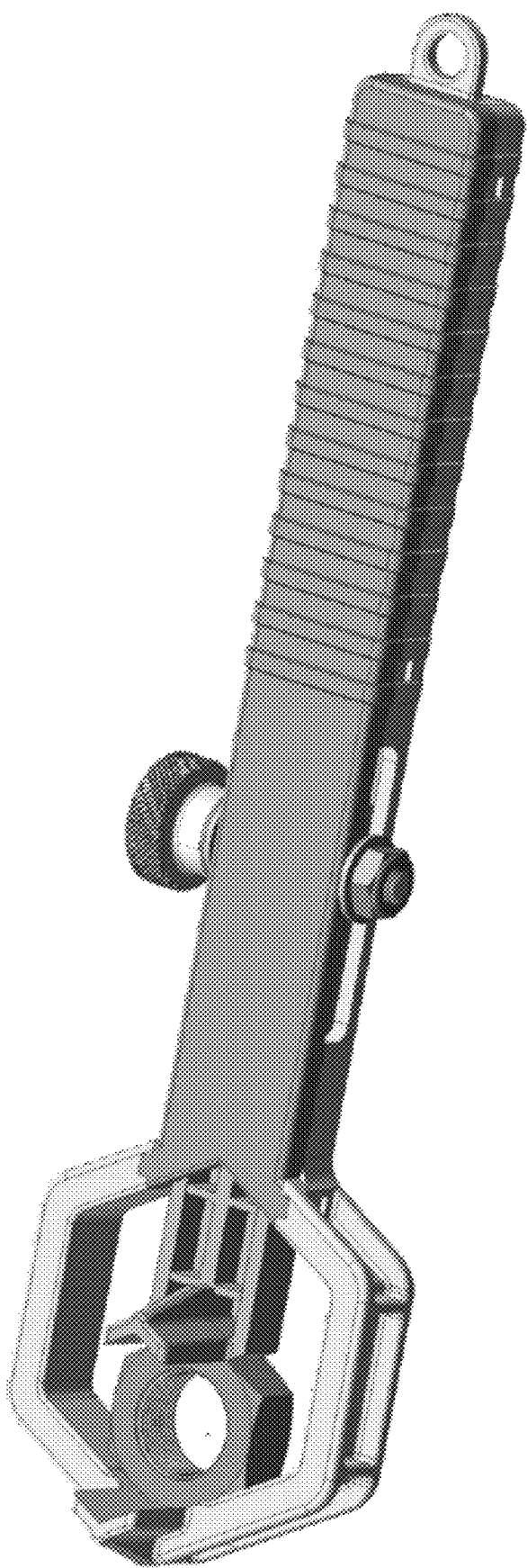
FIG. 1J is a bottom perspective view of an example embodiment with a fastener in a second position.

FIG. 1J is a bottom perspective view of an example embodiment with a fastener in a second position.

Figure 1K:
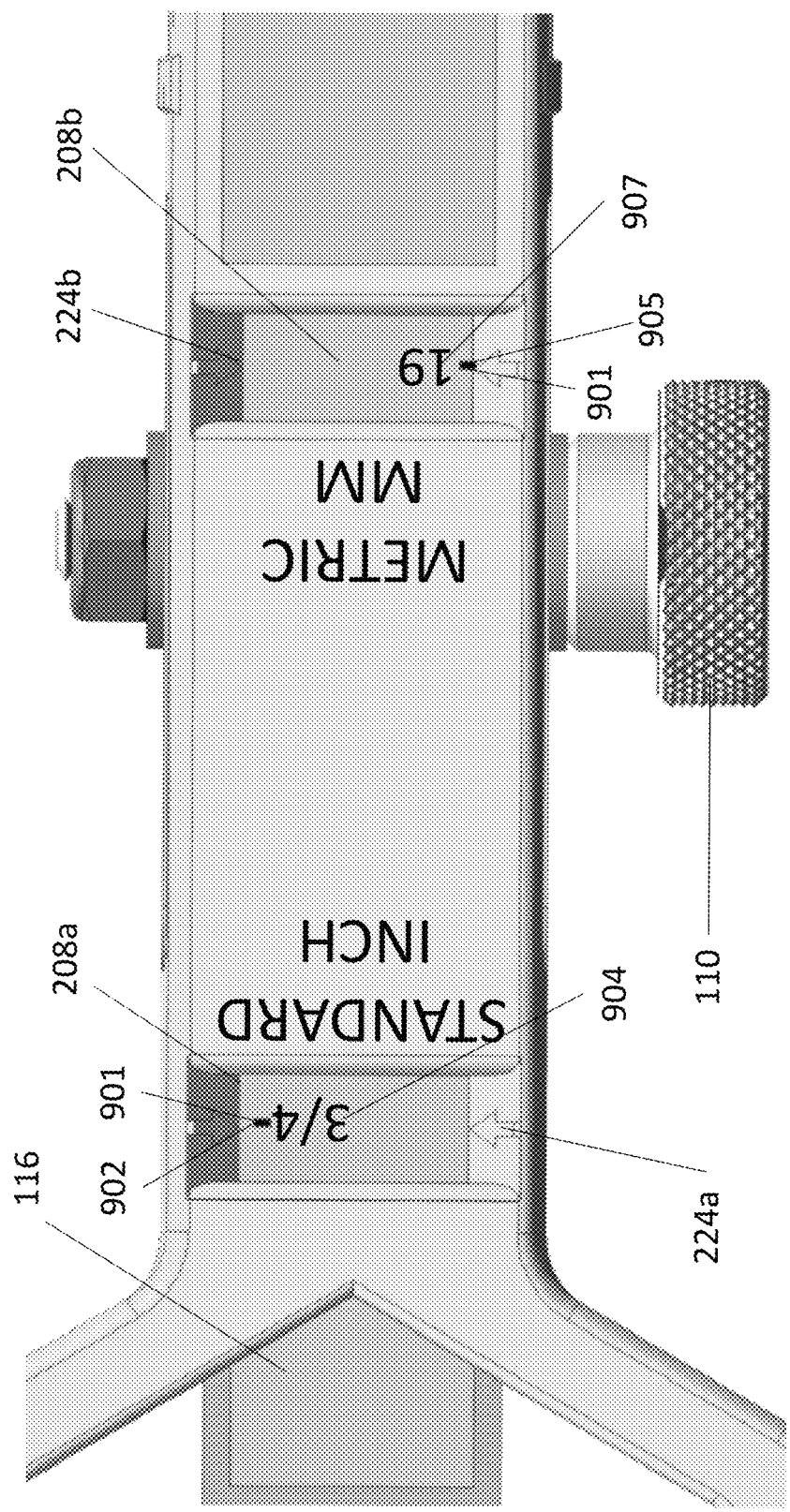
FIG. 1K is a close-up view of an example embodiment of the measurement windows area of a device.

FIG. 1K is a close-up view of an example embodiment of the measurement windows area of a device.

FIG. 2A is a top perspective view of an example embodiment of a fastener measurement tool. In the example embodiment, the orientation of screw 110, washers 114*a*, 114*b* and retaining nut 112 have been reversed with respect to body 200. This shows that in different embodiments of the invention, the device 600 can be oriented appropriately for left handed users as well as right handed users. In some embodiments a user can switch the device from left handed to right handed on their own while in other embodiments users must purchase either a right or left handed device.

Figure 2B:
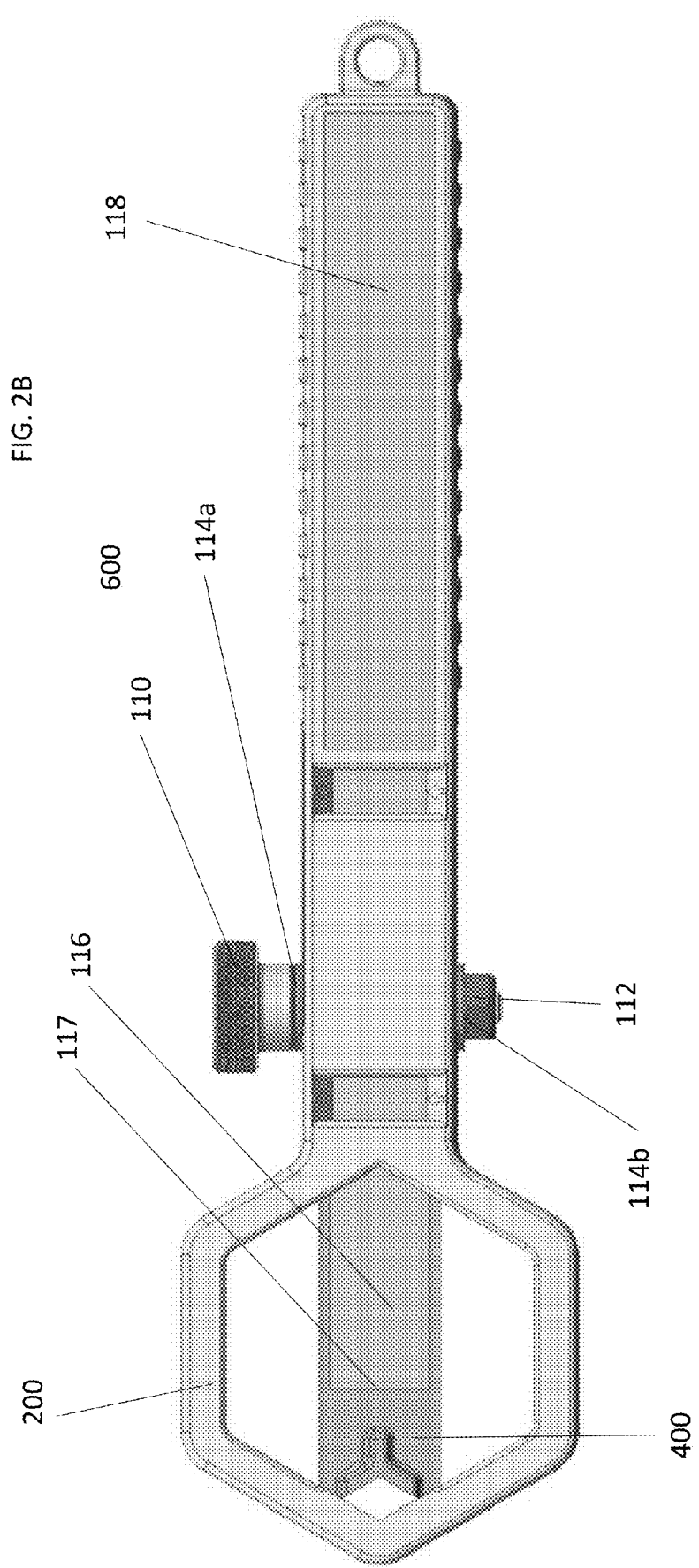
FIG. 2B is an assembled top view depicting an example embodiment of the device.

FIG. 2B is an assembled top view depicting an example embodiment of the device.

FIG. 2C is an exploded perspective view of an example embodiment from a top-down angle.

FIG. 2D is an exploded perspective view of an example embodiment from a bottom-up angle.

Figure 3A:
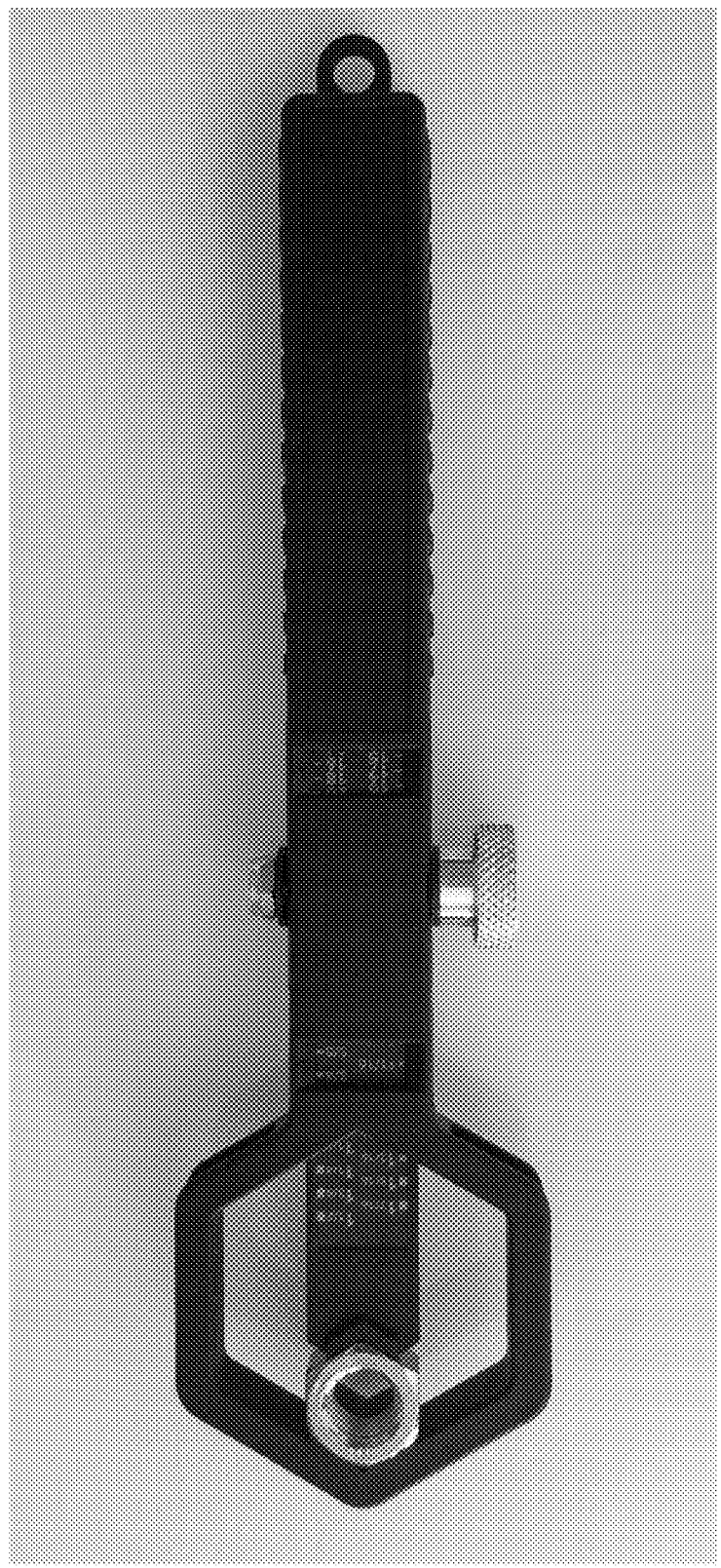
FIG. 3A is an example embodiment of an assembled device.

FIG. 3A is an example embodiment of an assembled device and a fastener.

Figure 3B:
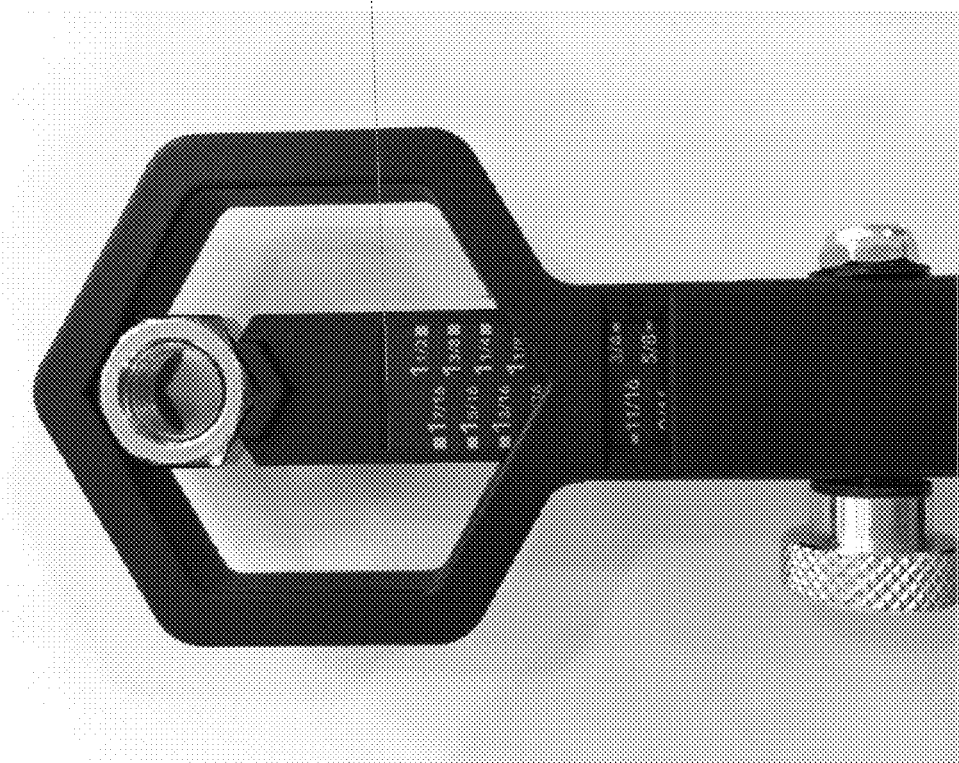
FIG. 3B is an example embodiment of an assembled device head area.

FIG. 3B is an example embodiment of an assembled device head area and a fastener.

Figure 4A:
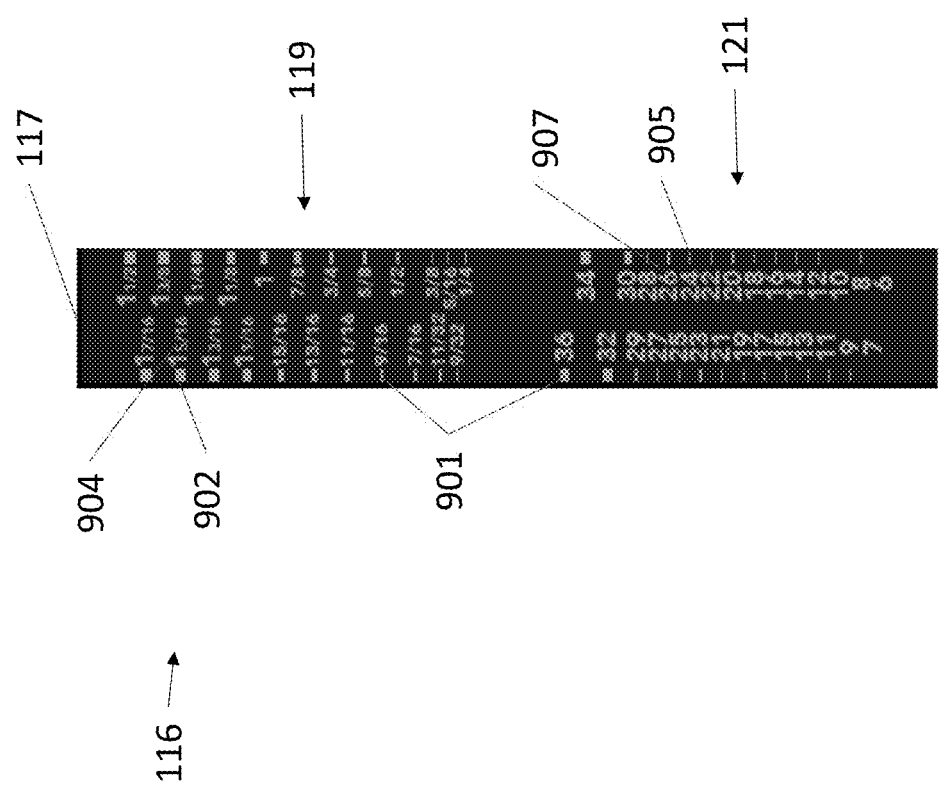
FIG. 4A is an example embodiment of a scale decal.

FIG. 4A is an example embodiment of a scale decal. In the example embodiment, at the top half of scale decal 116, standard measurements in inches are shown. At the bottom half of scale decal 116, metric measurements in mm are shown. Measurements for both standard and metric are shown in two columns to preserve space. While many of the embodiments shown herein exhibit scale decal 116 as being a separate component, it should be understood that the measurements could be printed on sliding shaft 400. In some embodiments the measurements are manufactured as part of the sliding shaft without a separate decal.

FIG. 4B is an example embodiment of a table 700 with inch measurements. FIG. 4C is an example embodiment of a table 800 with metric measurements. Tables 700, 800 represent an important facet in accurately displaying fastener size by the fastener size measurement tool when used to measure fastener dimensions. The following explanation describes a method for creating an accurate bar scale 116. "INCH" column 702 and "MM" column 802 refer to fastener size in inches and millimeters, respectively. "Max WAF" columns 704, 804 refer to the maximum width across the flats for a particular hexagonal shape of a particular size, directly across according to universally accepted standards. "Min WAF" columns 706, 806 represent the minimum width across the flats for a particular hexagonal shape in a particular size, directly across according to universally accepted standards. To elaborate, in FIG. 4D, "h" is the distance between opposite "flats" or flat side edges of a hexagonal bolt or nut and "d" is the distance between opposite corners of the hexagon. "Max WAC" columns 708, 808 represent the maximum width across a fastener upper face for opposing corners for a particular hexagonal shape of a particular size according to universally accepted standards. "Min WAC" columns 710, 810 represent the minimum width across a fastener upper face for opposing corners for a particular hexagonal shape in a particular size according to universally accepted standards. These dimensions can be generated using formulas for hexagons. A side length, height, diagonal, and area of a regular hexagon are all mathematically interrelated such that if the measure of one dimension is known, the others are determinable.

Figure 4D:
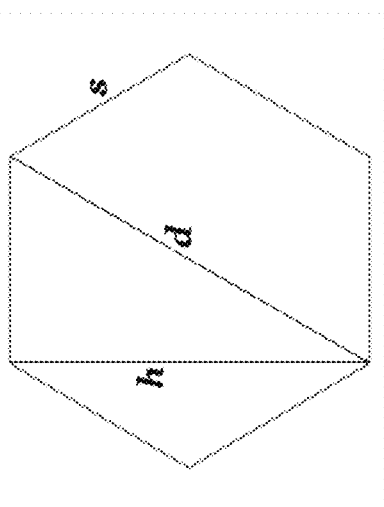
FIG. 4D is an example of a hexagon with dimension references.

An example embodiment of a hexagon is shown in FIG. 4D for reference. For example, for a side length s, height h, diagonal d, area a, and perimeter p, unknown dimensions can be calculated with the following formulas: $h=(\sqrt{3})s$, $d=2s$, $a=(1.5\sqrt{3})s^2$, and $p=6s$. Similarly, $s=h/(\sqrt{3})$; $d=2h/(\sqrt{3})$, etc. In FIGS. 4B-4C, "Bar Width" columns 712, 812 can be a subtraction of a "Min WAC" value from a "Max WAC" value in the same row. The result represents how large a corresponding bar 901 is printed or otherwise integrated on bar scale 116, as shown in FIG. 4A. Bars 901 are seen next to each numerical dimension 904, 907 at a respective Bar in Upper Decal Window 902 and Bar in Lower Decal Window 905 which are accurate locations representing measured sizes of fasteners. In an operable device, arrows 224a and 224b point to bars 902 and corresponding numerical dimensions 904, 907, representing the fastener size for the user. Bar in Upper Decal Window 902 and Bar in Lower Decal Window 905 have factored in where these dimensions are printed on bar scale decal 116 (e.g. FIG. 4A) and are measured with respect to a first edge 117 of decal 116, as shown in FIGS. 2B, 4A. In other embodiments, these points may be measured with respect to a different edge or with respect to a different location on a measuring device which is fixed with respect to a movable or slidable measuring component. The size of protrusions 212 and 412 in a closed position where they are directly adjacent to each other and a recessed area 406 on shaft 400 for decal 116 (as seen in FIG. 2C) where upper and lower decal points are to be located for extreme accuracy and ultimately notifying the user of the correct fastener size. The same holds true for FIG. 4C, these values represent metric formulas and calculations. Column 803 can represent the Minimum WAF in Metric. Column 806 can be a calculation of a metric dimension "Min WAF" into a standard inch format of that dimension (e.g. 5.82 mm is 0.2291). "Upper" and "Lower" as described herein are used with respect to a device in an orientation as shown in FIG. 3B and decal of FIG. 4A where "upper" area 119 generally relates to an area of bar scale decal 116 appearing in a first window 208a and "lower" area 121 generally relates to an area of bar scale decal 116 appearing in a second window 208b as shown in FIG. 1K. "Upper" and "Lower" are used as relational terms herein to distinguish areas of bar scale decal 116 and it should be understood that they are not absolute terms meant for purposes of the device in all orientations.

Here, the distance between the middle, angled point, of each protrusion 212, 412 as seen in FIG. 1B in other words, where protrusions 212 and 412 cradle a bolt such as a hex bolt at the inner corner of each protrusion 212, 412 can be represented within the range that the upper decal point 714 and lower decal point 716 represent for standard inch, simultaneously the range that the upper decal point 814 and lower decal point 816 represent for metric mm. These corner points in the trough of 212 and 412 can be integral measuring components. They can measure the WAC and that dimension is conveyed to the user on bar scale decal 116 with indications via arrow indicators 224a and 224b.

The Bar in Upper Decal Window 902 and Bar in Lower Decal Window 905 (e.g. in FIGS. 1K and 4A) can be important since they can be designed while accounting for dimensions of some or all components used to assemble a device, for example device 100 of FIG. 1A. Thus, when a bar scale decal 116 is placed or otherwise coupled into recessed area 406 of sliding shaft 400, the a Bar in Upper Decal Window 902 and a Bar in Lower Decal Window 905 can be the precise locations where the corresponding dimensions 904 and 907 are printed for a device (e.g. device 100) to accurately convey to the user the correct dimension of a measured fastener. These Points 902, 905 use the calculations and displayed dimensions seen between 714 with 716 as well as between 814 with 816. They can be used to when generating a decal 116 and ensure the precision of the measurement readings for different sized fasteners.

As seen in FIG. 4A, a width of a bar 901 for 1½" inch is much wider than a bar 901 for ¼". Width of bars 901 can directly correlate to a value in a row of column 716 minus a value in the same row of a column 714 in FIG. 4B (as well as 816 minus 814 of FIG. 4C). These calculations can be based on universal standards which give larger fasteners a larger tolerance in terms of size differences when manufactured. Likewise, smaller fasteners have a smaller tolerance range. The width of each bar 901 of FIG. 4A can take into account and display that tolerance for each specific size fastener.

Numerous embodiments include the use of digital electronic measurements and display of such measurements in addition to or instead of the manual display described above. In such embodiments, digital electronic embodiments can be similar in design and approach to the manual versions, but rather than using a manual bar scale with imprinted size dimensions at specific locations, one or more displays can be used to notify a user about a fastener size. In some embodiments, these displays can be two liquid crystal display (LCD) screens, one each for Standard Inch measurements for display at window 208a and Metric MM measurements for display at window 208b respectively.

Embodiments including digital electronics can utilize principles in common with a digital caliper. Digital calipers can operate with multiplate capacitive sensors and use multiple plates or electrical conductors to form a capacitive array that can accurately sense motion. Often there is a stator and slider or rotor plates in a digital caliper. The stator is a stationary part of the rotating system which is embedded in a metallic ruler on which an electronic housing slides. The electronic housing can contain a slider.

Figure 5:
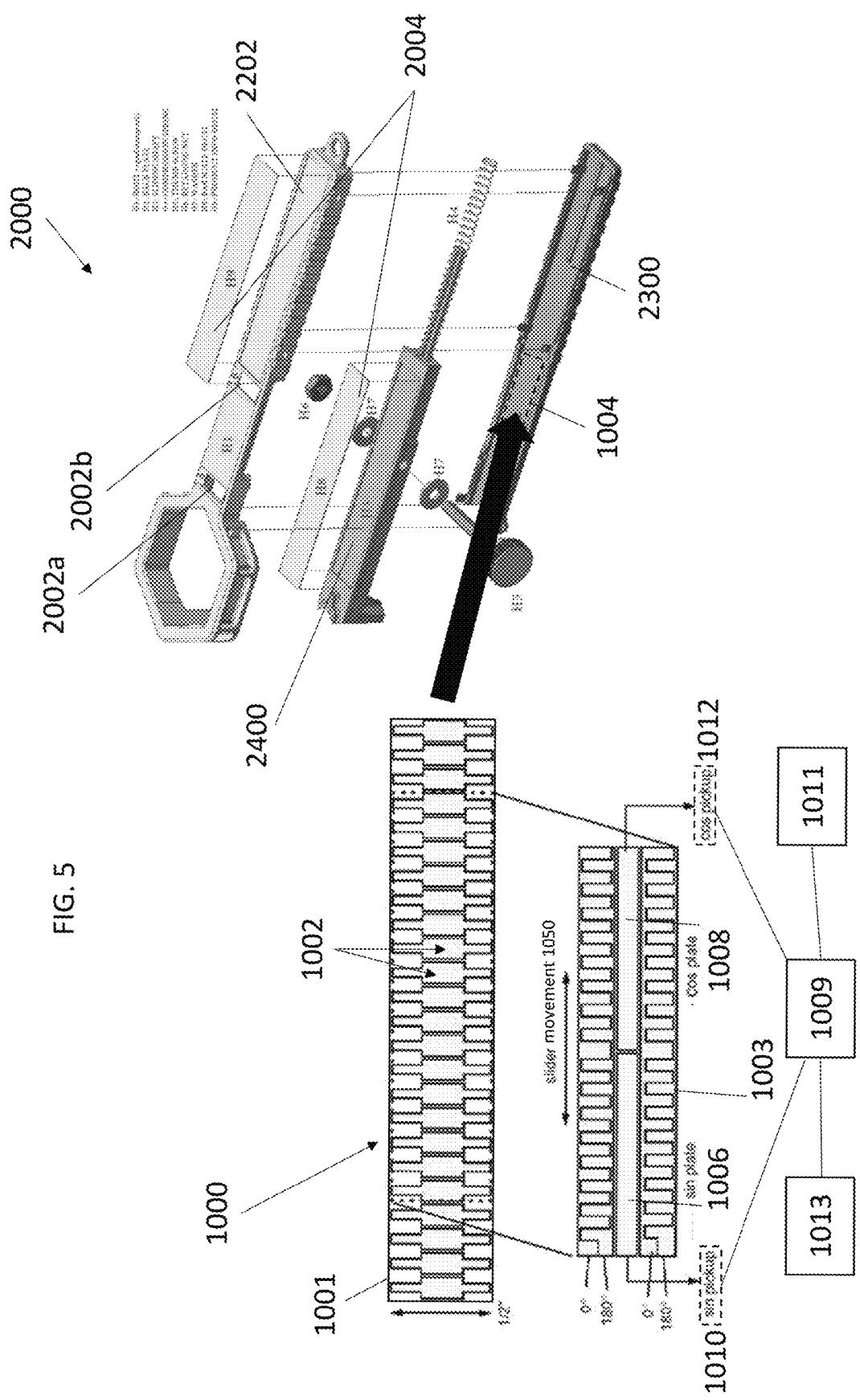
FIG. 5 is an example embodiment of a multiplate electrodes stator.

FIG. 5 is an example embodiment of a multiplate electrodes stator 1000. In an example embodiment, a stator 1000 can have a stator pattern with a plurality of electrodes 1002 that can be copper and can be fabricated on a top layer of a laminate 1001 which can be standard glass-epoxy as known in the art. The laminate 1001 can then be glued or otherwise affixed to a back plate 2300 in location 1004 of a device 2000 in digital measurement embodiments. Although shown as separate components in the example embodiment, decals 2004 can be omitted in various digital measurement embodiments. A slider pattern can be fabricated on a laminate 1003, which can be a printed circuit (PC) (see FIG. 6), and can drive a signal, e.g. a 100 kHz signal, through a sine plate 1006 and a cosine plate 1008, which can be copper, to stator electrodes 1002. This can be used to measure AC voltages at two centrally located pickup plates 1006, 1008 electrically coupled to a circuit board with one or more microcontrollers or processors 1009 by pickups 1010, 1012 which can be used to measure sine displacement and cosine displacement signals.

Separate sine and cosine signals can be monitored and measured determine a direction of motion, shown as slider movement 1050, of a sliding shaft 2400 with respect to back plate 2300, by measuring capacitance. A combination of one or more plate-counting digital circuits and analog interpolation between the sine and cosine plates can yield an accuracy of 0.0002" over 6" with standard PC fabrication methods. This information can be read by a microcontroller or processor 1009, compared with data stored in non-transitory computer readable memory 1009 and used to display a human readable measurement on an electrical displays 1011 and 1013 such as an LCD screen that is electrically coupled to the microcontroller or processor 1009 for viewing by a user. Thus, in an example embodiment, as sliding shaft 2400, with its affixed circuit board including centrally located plates 1006, 1008 travels within sliding shaft guide 2202 along a slider movement 1050, a microcontroller or processor 1009 can read a location of rectangular plates 1006, 1008 on a sine pickup 1010 and cosine pickup 1012 associated with plates 1006, 1008 respectively, with relation to electrodes 1002 of stator 1000 affixed to back plate 2300 and send the measurement, representing a specific location of sliding shaft 2400, to the microcontroller or processor 1009 which can then cause a stored dimension corresponding to the readings to be displayed on one or more LCD screens 1011 and 1013 located at one or more locations such as 2002a and 2002b of device 2000. In embodiments described herein, a small watch battery (not shown) providing microamp-level current consumption can be used to power the electrical components through appropriate electrical couplings. In other embodiments, other power sources can be used such as plugging into typical wall outlets or others.

Figure 6:
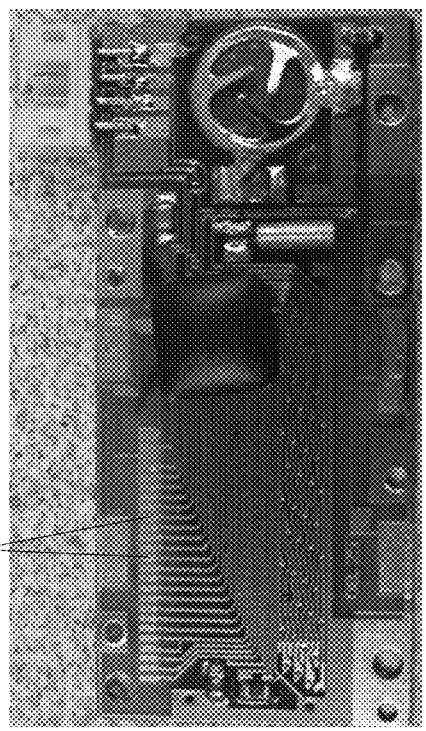
FIG. 6 is an example embodiment of multiplate electrodes etched on a printed circuit board of a digital caliper.

FIG. 6 is an example embodiment of multiplate electrodes 3002 etched on a printed circuit board 3000 of a prior art digital caliper.

Embodiments herein can be programmed using the formulas and calculations represented in FIG. 4B and FIG. 4C. As a particular example, ¾" and 19 mm will be described in detail below. When a user slides sliding shaft 400 into a position adjacent with fastener 500 (see FIG. 1F), sliding shaft 400 movement can be measured by at least one processor on an internal circuit board. This measurement can indicate a position of 0.855 from an initial position of 0. As shown in FIGS. 4B and 4C respectively, between the dimensions of 0.837 and 0.866, a corresponding fastener measurement of ¾" exists and between 0.849 and 0.864, a corresponding fastener measurement of 19 mm exists. As such, a LCD screen 1011 located at window 208a can display a reading of ¾" while at the same time a LCD screen 1013 located at window 208b can display 19 mm. As such, a user is notified that either a ¾" or 19 mm wrench or socket can be used interchangeably with the measured fastener.

In another example, assuming that a user slides sliding shaft 400 into a position adjacent with fastener 500 (see FIG. 1F), sliding shaft 400 movement can be measured by at least one processor on an internal circuit board. This measurement can indicate a position of 0.845 from an initial position of 0. In this example, the numerical figure only falls between 0.837 and 0.866 indicating a measurement of ¾". Here, a LCD screen 1011 at window 208a can display a reading of ¾" while a LCD screen 1013 at window 208b may display no reading and thus, be blank. This can indicate to a user that only ¾" wrenches or sockets can be used with the measured fastener. Measurements can be stored in non-transitory memory which is coupled with at least one processor that is coupled with one or more displays and a power source. All coupling is electronically functional as understood by one in the art to achieve the goals as understood in the subject matter described herein.

Embodiments of electronic fastener size measurement tools can include auditory components indicating a measurement has been made. Additionally or alternatively, different display components including light emitting diodes (LED's), touchscreens, or others can be included. Some embodiments can include transmission and/or reception circuitry for sending/receiving signals or data.

As used herein and in the appended claims, the singular forms "a", "an", and "the" include plural referents unless the context clearly dictates otherwise.

The publications discussed herein are provided solely for their disclosure prior to the filing date of the present application. Nothing herein is to be construed as an admission that the present disclosure is not entitled to antedate such publication by virtue of prior disclosure. Further, the dates of publication provided may be different from the actual publication dates which may need to be independently confirmed.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

In many instances entities are described herein as being coupled to other entities. It should be understood that the terms "coupled" and "connected" (or any of their forms) are used interchangeably herein and, in both cases, are generic to the direct coupling of two entities (without any non-negligible (e.g., parasitic) intervening entities) and the indirect coupling of two entities (with one or more non-negligible intervening entities). Where entities are shown as being directly coupled together, or described as coupled together without description of any intervening entity, it should be understood that those entities can be indirectly coupled together as well unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

What is claimed is:

1. A fastener measuring tool for nut and bolt sizes, comprising:
   a body having a handle and a head with a first corner jaw; and
   an internally housed sliding shaft slidably coupled with the handle and operable to move within the handle and displaying a measurement of a fastener when the tool is adjusted to the size of the fastener and having a second corner jaw, wherein first and second corner jaws are opposed and snugly grip a fastener.

2. The fastener measuring tool of claim 1, further comprising:
   a first window of the body for displaying measurement of a fastener in a first measurement system.

3. The fastener measuring tool of claim 2, further comprising:
   a second window of the body for displaying measurement of a fastener in a second measurement system.

4. The fastener measuring tool of claim 3, wherein the first measurement system is English (inch) units and the second measurement system is metric units.

5. The fastener measuring tool of claim 1, further comprising:
   a thumbscrew coupled to the sliding shaft and operable to:
   lock and maintain the sliding shaft in a fixed position with respect to the body for accurate display of measurements when the tool and a fastener have been separated; and
   allow a user to move the sliding shaft with respect to the body when unlocked.

6. The fastener measuring tool of claim 1, wherein the head further comprises:
   a hole sized for measuring and gripping fasteners and wherein the first corner is 120 degrees.

7. The fastener measuring tool of claim 6, wherein the hole is hexagonal and comprises the first corner jaw.

8. The fastener measuring tool of claim 1, further comprising:
   a second protrusion of the sliding shaft and a first protrusion of the body, wherein the protrusions provide a broader surface for measuring fasteners than the sliding shaft and body themselves.

9. The fastener measuring tool of claim 8, wherein the protrusions extend from the first and second corner jaws.

10. The fastener measuring tool of claim 1, wherein the body further comprises:
    a retainer for attaching a strap or string to carry the tool.

11. The fastener measuring tool of claim 1, wherein the sliding shaft is coupled with a measurement display decal.

12. The fastener measuring tool of claim 11, wherein the display decal comprises:
    fastener measurement values and associated bars of varying size in accordance with the measurement values.

13. The fastener measuring tool of claim 12, wherein the fastener measurement values and associated bars are located at accurately measured distances with respect to at least one edge of the decal.

14. The fastener measuring tool of claim 13, wherein the accurately measured distances are accurate to at least a third decimal point.

15. The fastener measuring tool of claim 13, wherein at least one indicator shows which bar corresponds to an accurate fastener measurement.

16. The fastener measuring tool of claim 1, wherein the sliding shaft comprises measurement indications.

17. The fastener measuring tool of claim 1, wherein the tool can measure fasteners between 6 mm and 36 mm.

18. The fastener measuring tool of claim 1, wherein the tool can measure fasteners between 0.25 inches and 1.5 inches.

19. The fastener measuring tool of claim 1, wherein the sliding shaft is coupled with a spring to provide a bias against fasteners for accurately measuring fastener size and wherein the spring is further coupled to the body such that fasteners can be cradled between the first corner jaw and the second corner jaw.

* * * * *